Dec. 8, 1925.  
W. J. MADDRELL  
DEVICE FOR MAINTAINING LIQUID LEVELS  
Filed Jan. 30, 1925
1,564,430
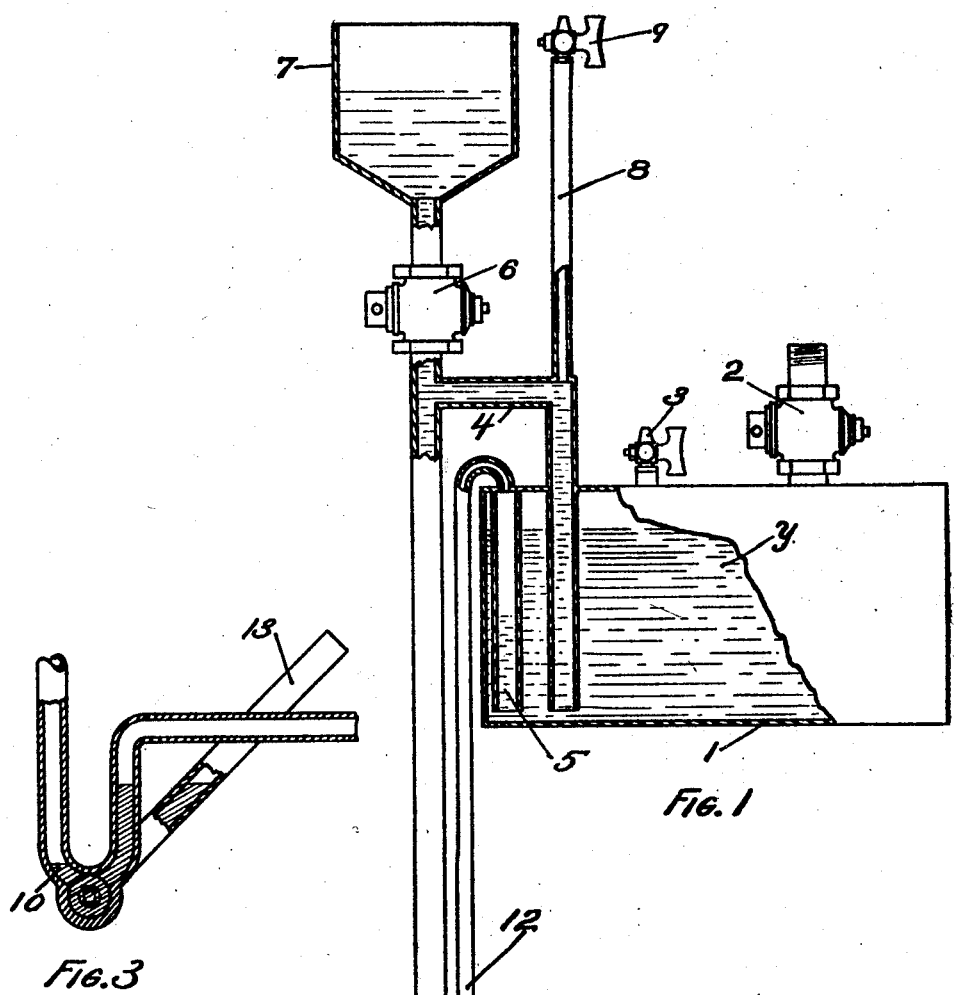
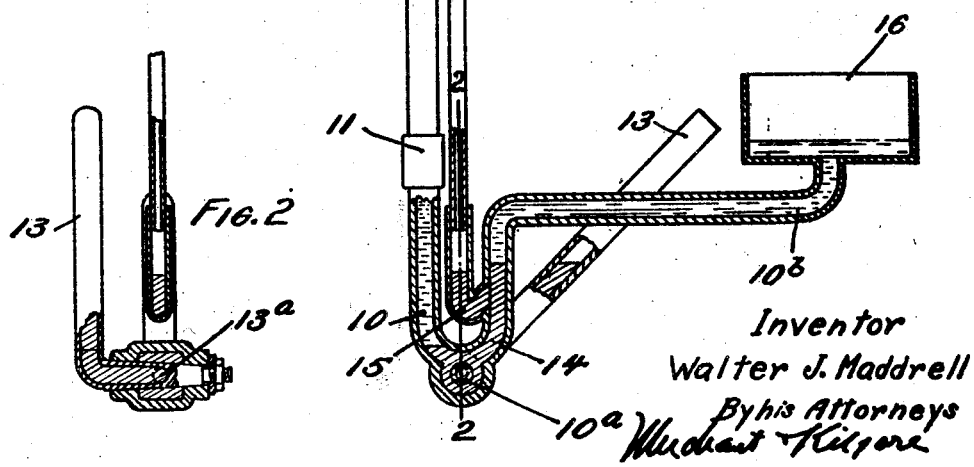
Inventor  
Walter J. Maddrell  
By his Attorneys Patented Dec. 8, 1925.

1,564,430

UNITED STATES PATENT OFFICE.

WALTER J. MADDRELL, OF MINNEAPOLIS, MINNESOTA.

DEVICE FOR MAINTAINING LIQUID LEVELS.

Application filed January 30, 1925. Serial No. 5,802.

*To all whom it may concern:*

Be it known that I, WALTER J. MADDRELL, a citizen of the United States, residing at Minneapolis, in the county of Hennepin and State of Minnesota, have invented certain new and useful Improvements in Devices for Maintaining Liquid Levels; and I do hereby declare the following to be a full, clear, and exact description of the invention, such as will enable others skilled in the art to which it appertains to make and use the same.

My invention provides an improvement in devices for automatically maintaining a predetermined level of liquid within the container from which it is to be distributed for various purposes or to other devices, such as oil burners or internal combustion motors. However, the invention is not limited to any particular ultimate use of the liquid, but is directed broadly to means for maintaining a predetermined or definite desired level of the liquid in any container where that result is desirable. Because of its peculiar character, the device may be appropriately designated as a "siphon gravity displacement control liquid level container". It has been successfully used and found efficient as a safety device for controlling a supply of oil to oil burners.

In the accompanying drawings, which illustrate the invention, like characters indicate like parts throughout the several views.

Referring to the drawings:

Fig. 1 is a view partly in side elevation and partly in vertical section, some parts being broken away, showing the preferred form of the device;

Fig. 2 is a section approximately on the line 2—2 of Fig. 1, some parts being shown in full elevation; and Fig. 3 is a fragmentary view chiefly in elevation, illustrating a more simple form of the device than that illustrated in Fig. 1.

Referring first to the construction illustrated in Figs. 1 and 2, the numeral 1 indicates a closed storage tank in which oil or other liquid $y$ is contained for distribution. This tank is provided with a normally closed filling valve 2, and a normally closed vent valve 3. The numeral 4 indicates a siphon tube, the short leg of which extends through the top of the tank 1 and terminates close to the bottom thereof. The numeral 5 indicates an equalizing tube that extends through the top of the tank 1 and also terminates near the bottom thereof. The siphon tube 4 has an upwardly extended portion in which is a normally closed valve 6 that controls the flow of liquid to said siphon tube from an open elevated priming tank 7. From the crown of the siphon tube 4 is a vent pipe 8 equipped with a valve 9.

The long depending leg of the siphon 4 is connected to one leg of a U-shaped mercury tube or trap 10 by a coupling 11, and the other leg of said tube 10 is connected to the equalizing tube 5 by a small tube 12. The mercury tube 10 is partly filled with mercury 14, the height or quantity of which is adjusted by means hereinafter described. The numeral 13 indicates an angularly adjustable standpipe or tube. the closed lower end of which is laterally bent and swivelled in a depressed portion $10^a$ of the trap or tube 10 and has communication with the latter through a port $13^a$. The lower end of the tube 12, in this preferred arrangement, is connected to the tube or trap 10 through a smaller or sort of secondary trap 15 that is adapted to contain more or less of the mercury 14.

The numeral 16 represents a bowl or container in which the level of the liquid, assumed to be oil, is to be maintained, and here it will be noted that that side or leg of the tube 10 to which the secondary trap 15 is connected is extended at $10^b$ and connected to the botttom of said container 16. The receptacle 16 may be assumed to be the bowl of an oil burner, an elevated bowl from which oil is fed to an oil burner under a predetermined head, or, for that matter, may be any container in which predetermined level of liquid is to be maintained.

The operation may be briefly described as follows:

The adjustable mercury standpipe 13 is angularly adjusted to some definite position or position assumed to be substantially correct, the filling valve 2 and vent valves 3 are opened and the tank 1 is filled with the oil or liquid. Said valves 2 and 3 and the siphon priming valve 6 are then closed and the siphon priming tank 7 is filled. Next, the siphon vent valve 9 is opened and the siphon-filling valve 6 is then opened, thereby permitting the oil from the priming tank 7 to run into and fill the siphon 4 from which air will escape through the vent valve 9.

Next, the siphon vent valve 9 and filling valve 6 are closed and the storage tank vent valve 3 is opened.

When these adjustments have been made, the mercury standpipe 13, which is then partly filled with mercury, will be adjusted to the angle or elevation at which the pressure of the oil in the siphon will force the mercury 14 from the left-hand leg of the trap or U-tube 10 into the right-hand leg thereof, and into the secondary trap 15 to such an extent that the oil in the long depending leg siphon 4 will pass to the right of the lowest point of the trap 10 and will then, under the action of gravity, flow upward through the mercury 14 in the right-hand leg of the trap 10 and from thence upward through the tube 10$^b$ into the receptacle 16. Here it will be noted that the natural tendency of the oil to flow down through the long leg of the siphon 4 will be resisted in proportion to the elevation of the mercury column and that the elevation of the mercury column will be increased in the trap 10 as the mercury standpipe 13 is turned toward a vertical position, and will be decreased as the said leg 13 is turned toward a horizontal position, for, as said leg 13 is turned downward, more of the mercury will be contained therein for any given altitude of the mercury column. Of course, the more of the mercury that runs into the secondary trap, the less will be the altitude of the mercury column, and it is also evident that the weight of the oil or fluid in the pipe 10$^b$ and receptacle 16 above the mercury column will add its pressure to that of the mercury column in resisting the flow of the oil downward through the long leg of the siphon 4. The adjustment of the standpipe 13, therefore, determines the altitude of the oil in the container 16, for, as noted, the pressure of the oil and of the mercury will counterbalance the pressure of the oil in the siphon and thereby prevent further flow when the predetermined level of the oil in said container has been reached. Of course, as soon as the level of the oil in the receptacle 16 has been slightly lowered, more oil will flow through the siphon to re-establish the said counterbalance and maintain the determined oil level.

The following further important action should now be noted: As the oil in the tank 1 is decreased and its level lowered, the pressure in the siphon 4 will be correspondingly decreased and, except for the equalizing device 5—12—15, corresponding adjustments of the standpipe 13 would be required to maintain a fixed level of the liquid in the container 16. With the said equalizing device, however, such adjustments of the standpipe 13 are made unnecessary because of the following action: As the level of the oil within the tank 1 decreases, there will be a corresponding decrease in pressure of the air within the equalizing tube 5, equalizing tube 12, and secondary trap 15, and obviously, as the pressure in the trap 15 decreases, more mercury will run from the main trap 10 into said second trap, thereby decreasing the altitude of the mercury column to an extent that will equalize or offset the decreasing pressure in the siphon 4, due to the noted decreased altitude of the liquid in the tank 1.

By this simple equalizing device, constant re-adjustments of the standpipe 13 are made unnecessary to maintain the predetermined level in the container 16, and adjustments of said standpipe 13 are only required when it is desired to change the predetermined altitude or level of the oil or liquid within the receptacle 16 or similar device.

Fig. 3 illustrates a construction that is like that illustrated in Figs. 1 and 2, except that the equalizing device is omitted, and with which arrangement, the standpipe 13 would require repeated re-adjustments to maintain an unchanging level or elevation of liquid within the container 16 or other receiving receptacle.

The purposes involved in the device above described are thought to be broadly new and are herein broadly claimed and, consequently, it follows that the details of construction and arrangements of parts may be greatly varied within the scope of the invention as herein disclosed and claimed.

What I claim is:

1. The combination with a liquid-containing supply tank, of a siphon connected thereto and having a long leg depending therefrom, a trap to one side of which the long leg of said siphon is connected, and a liquid receptacle connected to the other leg of said trap, said trap containing a liquid that is heavier than the liquid contained in said supply tank and discharged therefrom through said siphon.

2. The combination with a liquid-containing supply tank, of a siphon connected thereto and having a long leg depending therefrom, a trap to one side of which the long leg of said siphon is connected, a liquid receptacle connected to the other leg of said trap, said trap containing a liquid that is heavier than the liquid contained in said supply tank and discharged therefrom through said siphon, and an adjustable standpipe connected to the lower portion of said trap and into which a greater or less portion of the heavy liquid in said trap will flow from said trap thereinto under different adjustments thereof.

3. The structure defined in claim 1 in further combination with a standpipe pivotally connected to and having communication with the lower portion of said trap and adjustable to vary the level of the liquid maintained in said liquid receptacle.

4. The structure defined in claim 1 in further combination with a valve-equipped priming device and a valve-equipped air vent connected to the upper portion of said siphon.

5. The structure defined in claim 1 in further combination with a valve-equipped priming device and a valve-equipped air vent connected to the upper portion of said siphon, the said supply tank having a valve-equipped filling tube and a valve-equipped air vent.

6. The structure defined in claim 2 in further combination with a valve-equipped priming device and a valve-equipped air vent connected to the upper portion of said siphon.

7. The structure defined in claim 2 in further combination with a valve-equipped priming device and a valve-equipped air vent connected to the upper portion of said siphon, the said supply tank having a valve-equipped filling tube and a valve-equipped air vent.

8. The structure defined in claim 1 in further combination with a secondary trap connected to the delivery side of the first noted or main trap and having an upwardly extended air tube terminating in a depending equalizing tube, the lower end of which opens into said supply tank near the bottom thereof.

9. The combination with a liquid-containing supply tank, of a siphon connected thereto and having a long leg depending therefrom, a trap to one side of which the long leg of said siphon is connected, a liquid receptacle connected to the other leg of said trap, said trap containing a liquid that is heavier than the liquid contained in said supply tank and discharged therefrom through said siphon, and a pressure-equalizing device connected to the delivery side of said previously noted trap and subject to varying pressure due to changing altitude of the liquid within said main tank.

10. The structure defined in claim 1 in which the liquid contained in said trap is mercury.

11. The structure defined in claim 2 in which said standpipe has a laterally bent hollow portion pivotally mounted in the lower portion of said trap and having a port communicating therewith.

12. The structure defined in claim 9 in further combination with a standpipe pivotally connected to the lower portion of said trap and having a port communicating therewith.

13. The combination with a liquid-containing supply tank, of a siphon connected thereto and having a long leg depending therefrom, a trap to one side of which the long leg of said siphon is connected, a liquid receptacle connected to the other leg of said trap, said trap containing a liquid that is heavier than the liquid contained in said supply tank and discharged therefrom through said siphon, and a pressure-equalizing conduit connected to the lower portion of said supply tank and to said trap, whereby varying pressure due to varying altitude of the liquid in said supply tank will vary the pressure-resistance to displacement of the heavy liquid in said trap.

14. The structure defined in claim 9 in which said pressure-equalizing device includes a tube, the upper portion of which is extended downward in said supply tank and terminates near the bottom thereof.

15. The structure defined in claim 9 in further combination with a valve-equipped priming tube and a valve-equipped air vent connected to the crown or upper portion of said siphon.

16. The structure defined in claim 9 in further combination with a valve-equipped priming tube and a valve-equipped air vent connected to the crown or upper portion of said siphon, the said supply tank having a valve-equipped filling tube and a valve-equipped air vent.

In testimony whereof I affix my signature.

WALTER J. MADDRELL.

Certificate of Correction.

It is hereby certified that in Letters Patent No. 1,564,430, granted December 8, 1925, upon the application of Walter J. Maddrell, of Minneapolis, Minnesota, for an improvement in " Devices for Maintaining Liquid Levels," an error appears in the printed specification requiring correction as follows: Page 3, after line 92 insert the following as claim 17:

*17. The combination with a liquid-containing supply tank subject to atmospheric pressure and having a depending discharge tube, a trap to one entrance of which said discharge tube is connected, a liquid receptacle connected to the other entrance of said trap, said trap containing a liquid that is heavier than the liquid contained in said discharge tube and opposing the discharge of the lighter liquid through said trap, and means for varying the amount of said heavy liquid in said trap;* and that the said Letters Patent should be read with this correction therein that the same may conform to the record of the case in the Patent Office.

Signed and sealed this 19th day of January, A. D. 1926.

[SEAL.]

WM. A. KINNAN,
*Acting Commissioner of Patents.*